US008509097B1

(12) United States Patent
Gourlay et al.

(10) Patent No.: US 8,509,097 B1
(45) Date of Patent: Aug. 13, 2013

(54) NETWORK ACCESSIBILITY TO ANY NETWORK ATTACHED DEVICE DURING REBOOT AND POWER LOSS

(75) Inventors: Douglas A. Gourlay, Sausalito, CA (US); Prashant Gandhi, San Jose, CA (US); Mark McKee, San Jose, CA (US); Omar G. Abuabara, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1331 days.

(21) Appl. No.: 10/913,590

(22) Filed: Aug. 5, 2004

(51) Int. Cl.
*G01R 31/08* (2006.01)
*H04L 12/28* (2006.01)
*H04L 12/403* (2006.01)

(52) U.S. Cl.
USPC ......... 370/251; 370/252; 370/395.2; 370/449

(58) Field of Classification Search
USPC .................. 370/200, 223, 218–220, 227–228, 370/241–247, 251–252, 254, 346, 449, 395.2, 370/395.3, 400–401; 709/220–224, 227–228
See application file for complete search history.

(56) References Cited

U.S. PATENT DOCUMENTS

| | | | | |
|---|---|---|---|---|
| 5,367,670 | A * | 11/1994 | Ward et al. | 714/47 |
| 6,268,999 | B1 * | 7/2001 | TG | 361/679.02 |
| 6,764,343 | B2 | 7/2004 | Ferentz | |
| 7,020,532 | B2 * | 3/2006 | Johnson et al. | 700/89 |
| 7,035,209 | B2 * | 4/2006 | Dang et al. | 370/228 |
| 2003/0220899 | A1 * | 11/2003 | Numanoi et al. | 707/1 |
| 2003/0226015 | A1 * | 12/2003 | Neufeld et al. | 713/166 |
| 2003/0233583 | A1 * | 12/2003 | Carley | 713/201 |
| 2003/0233593 | A1 * | 12/2003 | Kalambur et al. | 713/320 |
| 2004/0219955 | A1 * | 11/2004 | daCosta | 455/574 |
| 2004/0230846 | A1 * | 11/2004 | Mancey et al. | 713/300 |

OTHER PUBLICATIONS

Cisco Systems, Inc.,"Power Over Ethernet Solutions, Drivers and Applications for the Power over Ethernet Solution" (White Paper Document), Copyright © 1992-2004, 6 pages.

* cited by examiner

*Primary Examiner* — Michael Thier
*Assistant Examiner* — Redentor Pasia
(74) *Attorney, Agent, or Firm* — Fish & Richardson P.C.

(57) ABSTRACT

A data communication network (DCN) having a plurality of network devices coupled to the DCN with at least one of the network devices having a "boot once" connectivity manager processor (CMP). The CMP receives its power over the DCN rather than from the power applied to the network devices. The CMP can execute special operating system code and maintain network connectivity even if the network device itself is powered off, is being booted or is otherwise non-functional. The CMP is also coupled to the network device's memory so that it may respond to out-of-band polling requests for device status information from network management tools. With CMP, network administrators can monitor the boot process of network devices, determine that a network device is non-functional due to power loss and can maintain an accurate inventory status of spare network devices that are stored un-powered in a spares closet.

35 Claims, 4 Drawing Sheets

NETWORK ACCESSIBILITY TO ANY NETWORK ATTACHED DEVICE DURING REBOOT AND POWER LOSS

BACKGROUND OF THE INVENTION

The present invention relates to computer networks and more particularly to network devices that are accessible over a network connection during reboot or power loss.

As computer network technology and security threats evolve, it becomes very important to optimize both network operation and security. This challenge often calls for remote network management strategies that include both in-band and out-of-band network management tools. In-band management tools are widely used and typically employ either a telnet connection to a network device, such as a server or a router, or management tools based on the Simple Network Management Protocol (SNMP). SNMP-based tools include real-time fault detection tools that detect, log, notify users of, and automatically correct network faults. Because faults can cause downtime or unacceptable network degradation, fault management is perhaps the most widely implemented tool.

In-band network management is the most common way to manage a network. However, when a network router malfunctions, by way of example, traffic cannot flow through the network. This creates a problem because the in-band management tools cannot be used to determine the source of the fault or to correct the fault. To address this problem, most mission-critical networks also include the out-of-band network, which is an alternate path to reach each network device for diagnostic purposes even when the in-band network is down.

A data communication network (DCN) is commonly used to implement the out-of-band management of networked devices. The DCN is often referred to as the out-of band network because it is not used for 'transmit data' services. Rather, out-of-band management provides the network administrator the ability to manage the network in parallel with the in-band management tools and data traffic. As is well understood in the art, network administrators can utilize out-of-band network tools to facilitate remote installation, updates, and upgrades to the operating system, BIOS and any software operating on each networked device. Further, the out-of-band network tools enable the network administrator to isolate the cause and recover the failure, or reduce the impact of a network failure. As a further advantage, management-related network traffic is moved to the out-of-band network so that data transmit services can fully utilize the available bandwidth of the in-band network.

Unfortunately, even out-of-band management tools are useless when the network administrator is trying to bring a networked device back on-line after it has been shut down. This problem arises because when a network device is being booted, the device is non-functional during the boot process even if the out-of-band network is otherwise available. Thus, the system administrator cannot use the fault manager tool to monitor or collect data from the device during boot-up to help pinpoint the source of the error. This lack of visibility during the boot process is particularly troublesome when the error affects a device located at a remote site because a technician must be dispatched to diagnose the error on-site. Clearly, what is needed is the ability to monitor network devices during the boot process so that the network administrator can remotely diagnose any boot errors and get the device back on-line.

Monitoring the boot process is especially critical whenever the operating system or software is updated because the network device must often be rebooted to start executing the new code. If the installed update was defective, the device may be unable to boot properly or may not be operable thereby rendering both in-band and prior art out-of-band management tools ineffective. Clearly, it is desirable to provide network administrators the ability to monitor the reboot process in order to verify that the new update was correctly installed and that the network device functions correctly. Alternatively, if the software is defective, it would desirable to enable the network administrator to gain control of the device and uninstall the software even if the network device cannot be fully booted.

In other situations, the network device may lose power and go off-line. When power to a network device is lost, it is desirable that the network administrator be able to quickly ascertain the cause for the device going offline. With existing management systems however, the loss of power will take the device off both the in-band network as well as the out-of-band network and the administrator will not have the tools to determine the source of the problem other than to dispatch a technician to the site. It is obviously desirable to provide the network administrator the ability to remotely correct a malfunction rather than to incur the time and expense associated with dispatching a technician.

While network management is critical to maintaining the operation of the DCN, there are times when critical devices will fail. In such cases, it is necessary to swap out the defective device and replace it with a functional device. Accordingly, it is necessary to store spare devices in widely dispersed geographic areas so that spares are readily available. Unfortunately, many network devices are very expensive so there is a great need to carefully manage the inventory of spare devices to ensure their availability in the event of a network failure. For this reason, many enterprises will store several spare servers, routers and switches in a locked room or cage for use as replacement parts. Although the system administrator may count the spare devices on a periodic basis, the count may only be accurate at the time it was taken because expensive network devices are often theft targets. Thus, the most recent inventory count may be grossly inaccurate if a theft of the spare devices has not yet been detected. To combat the constant theft problem, it is desirable to maintain a real-time inventory of the spare devices and to constantly monitor the availability of the stored spare devices. In this manner, if a network error is traced to a router or a switch, the system administrator is assured that the necessary spare equipment will be available to fix the problem.

SUMMARY OF EMBODIMENTS OF THE INVENTION

The preceding and other shortcomings of the prior art networks are addressed and overcome by the present invention. In accordance with an embodiment of the present invention, the advantages of an out-of-band network management network are combined with a system that enables a network administrator to monitor a networked device during the boot process, when power is lost or to monitor a spare networked device that is only connected to the out-of-band network and not to the in-band network or a power source. In particular, the present invention provides a data communication network (DCN) that interconnects one or more network devices each of which include a connectivity manager processor (CMP).

The CMP functions as a communication bridge between an upstream network hub device and the network device. The CMP includes a low power microprocessor and an embedded operating system, which is preferably stored in non-volatile memory, such as Flash memory. The CMP receives its power over the DCN rather than from a power outlet that supplies power to the network device. By receiving power over the network, the CMP can execute code and maintain network accessibility when the network device itself is powered off, is being booted or is otherwise non-functional.

In addition to supplying power, the DCN also couples the CMP to a workstation running a network management tool. From the workstation, a network administrator can establish a telnet or SSH (Secure Shell) connection with the CMP over the network to control and monitor network devices during a power cycle or a device boot. The management station can be attached at any point on the DCN and need not be directly attached to the CMP.

To assist in network management, the CMP is coupled to the network device's memory and bus so that network status information can be passed to the network administrator with minimal impact on the operation of the network device.

In another embodiment, the CMP of a spare network device stored in a supply closet in a powered down state is coupled to the DCN. Because the CMP receives its power over the out-of-band network, the CMP can operate to provide network accessibility without powering up the network device. Computer code executed by the CMP is adapted to respond to SNMP polling requests and to provide the network administrator with an accurate inventory status of the network devices being stored as spares. Inventory status may include the serial number, model number, device ID, device configuration and other information.

The CMP is primarily dedicated to the task of managing communication traffic over the out-of-band network. As such, the CMP's microprocessor may operate at a relatively slow clock rate and at a corresponding low power level. The limited functionality of the CMP enables a compact operating system that is readily stored in Flash or other non-volatile memory. Expensive random access memory is limited because the operating system code may be executed directly from the non-volatile memory without having to boot the operating system code into RAM. Thus, the CMP is easily adapted to a small form factor and is easily integrated with existing network devices.

The foregoing and additional features and advantages of this invention will become apparent from the detailed description and review of the associated drawing figures that follow.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
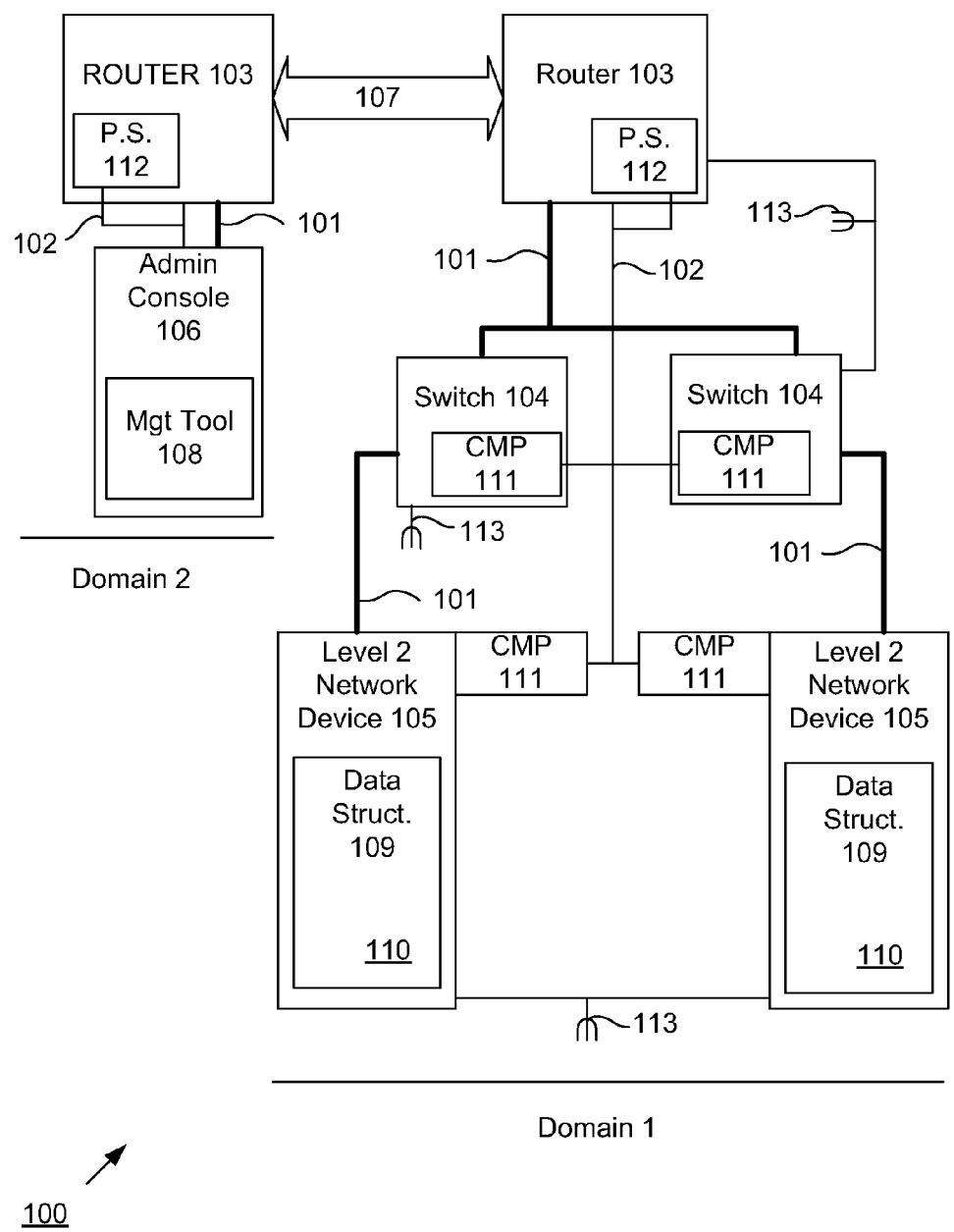
FIG. 1 is a simplified block diagram illustrating one exemplary embodiment of a data communication network (DCN) in accordance with an embodiment of the present invention.

Referring now to the drawings more particularly by reference numbers, a simplified embodiment of a representative data communication network (DCN) 100 is illustrated in FIG. 1. It is to be understood that networking requirements depend on many factors so the actual configuration of a DCN will likely vary depending on the specific capabilities required for a given computing environment. As such, the network configuration illustrated in FIG. 1 is exemplary in nature and is not intended to reflect any particular network.

In general, each DCN 100 will include both an in-band communication channel 101 and an out-of-band Ethernet-based management channel 102. In other embodiments, management channel 102 may be a RS-232, USB or other bus capable of connecting devices in a network configuration.

In-band communication channel 101 is the data transport channel and is classified as either a Layer 2 transport layer or a Layer 3 transport layer. Layer 3 operates at the network domain layer by examining packet information and forwarding the packets based on the associated network-layer destination addresses. Layer 3 is primarily related to the routing of traffic between network devices located in different domains. Layer 2 operates at the workstation data link layer address level and traffic is routed based on frame address information. Layer 2 is primarily related to traffic routed between network devices within a single domain.

Out-of-band management channel 102 allows a network administrator to manage network devices, such as routers 103, switches 104 and clients 105, from an administrator's console 106 regardless of the state of communication channel 101 and regardless of the domain in which the network devices are located. For example, when a virus or other anomaly affects a network device in domain 1, the administrator can remotely gain control of the afflicted device over management channel 102 and use a set of network management tools 108, such as a fault management tool, executing on console 106 in domain 2 to shut down ports and have some means of identifying and correcting the fault.

A Gigabit Ethernet network 107 couples routers 103 across domains Network 107 provides high throughput (10 Gbps) and long distance (40 km+) storage interconnect. Routers 103, such as those manufactured by Cisco Systems, Inc., the assignee of the present invention, direct network traffic based on the destination network layer address (Layer 3). Routers 103 can support all widely implemented routing protocols and have the capability to optimize packet transport by rapidly calculating optimal routes. Clearly, as the volume of traffic and the complexity of the DCN increases, there is a need to ensure that the routers are handling the traffic and not spending time determining the operational status of other routers.

Switches 104 logically separate network segments within the same network domain. One popular switch is the Cisco Catalyst 6500 Series switch also manufactured by Cisco Systems, Inc. Switches 104 operate at the OSI data link layer (Layer 2 or peer-to-peer communication level) and connect clients 105 to the network. A wide variety of different types of clients 105 may be connected to the network by switch 104.

For example, clients 105 may include application servers, workstations, networks storage devices, tape libraries, web cameras or Internet telephones.

One type of network management tool 108 is based on the Simple Network Management Protocol (SNMP), which uses both software and hardware agents to monitor and report on the activity of each device in the network. During normal operation, each network device, as illustrated with devices 105, will maintain a data structure 109 in its memory 110 to store device status information. When polled, each device will provide its status information to management tool 108 or other network devices. Using this status information, the administrator can determine the state of each device 103-105 and each router and switch will know the operational status of the other routers and switches on the DCN.

There are primarily two ways to acquire the status information: in-band network management and out-of-band network management. In-band is managing locally through the network itself, using a telnet connection to a network device or by using SNMP-based tools. In-band is the most common way to manage a network. However, for large or business-critical networks, in-band network management alone is not sufficient because if the in-band channel 101 is down, it cannot be used to reach the affected device and resolve the fault.

Out-of-band network management uses an alternate or secondary access path, channel 102, to get around the fault or to access the network device with the fault. It enables the administrator to monitor normal operation of a network device when the in-band communication channel 101 is heavily loaded or is otherwise not available due to a system crash or virus. However, the inability to poll a network device when power is lost or when the network device is booting creates a window of time during which the system administrator is unable to monitor the device and acquire status information. Accordingly, the present invention further includes an "always on" connectivity manager processor (CMP) 111. CMP 111 is dedicated to the task of managing communications over the out-of-band management channel 102 and providing status information even if power to the network device is removed or the network device is in the process of booting.

DCN 100 also includes one or more power-sourcing devices. As illustrated, each router 103 includes a power supply 112 that is capable of generating the voltage and current levels required by at least one of the network devices 104 and 105. Although not illustrated, each router 103 may also include an associated CMP.

In one preferred embodiment, management channel 102 comprises an Ethernet network and power supply 112 that is a capable of supplying power at the levels required by IEEE standard 802.3af (Power over Ethernet) or more specifically, 48 volts (dc) over a 100 meter cable with at least 12 watts of received power at the powered network device. Other types of power over Ethernet capabilities are known and may be used to provide power to CMP 111. For example, Cisco Systems provides a proprietary power over Ethernet capability to power Ethernet-enabled telephones or cameras.

As illustrated in FIG. 1, one network device in each domain includes a power supply 112. Power supply 112 is preferably mounted on a daughter card that, in turn, is mounted inline to provide power over the Ethernet network. With power supply 112, router 103 can deliver power to a plurality of CMPs 111 each associated with one of the network devices 104 and 105. Alternatively, power may be sourced mid-span from a separate universal power supply (not illustrated) that is connected to channel 102 through a network switch such as, by way of example, one of the switches 104. Due to line loss and power demands of a typical router or switch, the Ethernet power source 112 is unable to source power to high power devices such as routers, switches or workstations. For this reason, network devices also require a local power source, such as building power, in order to operate.

Figure 2:
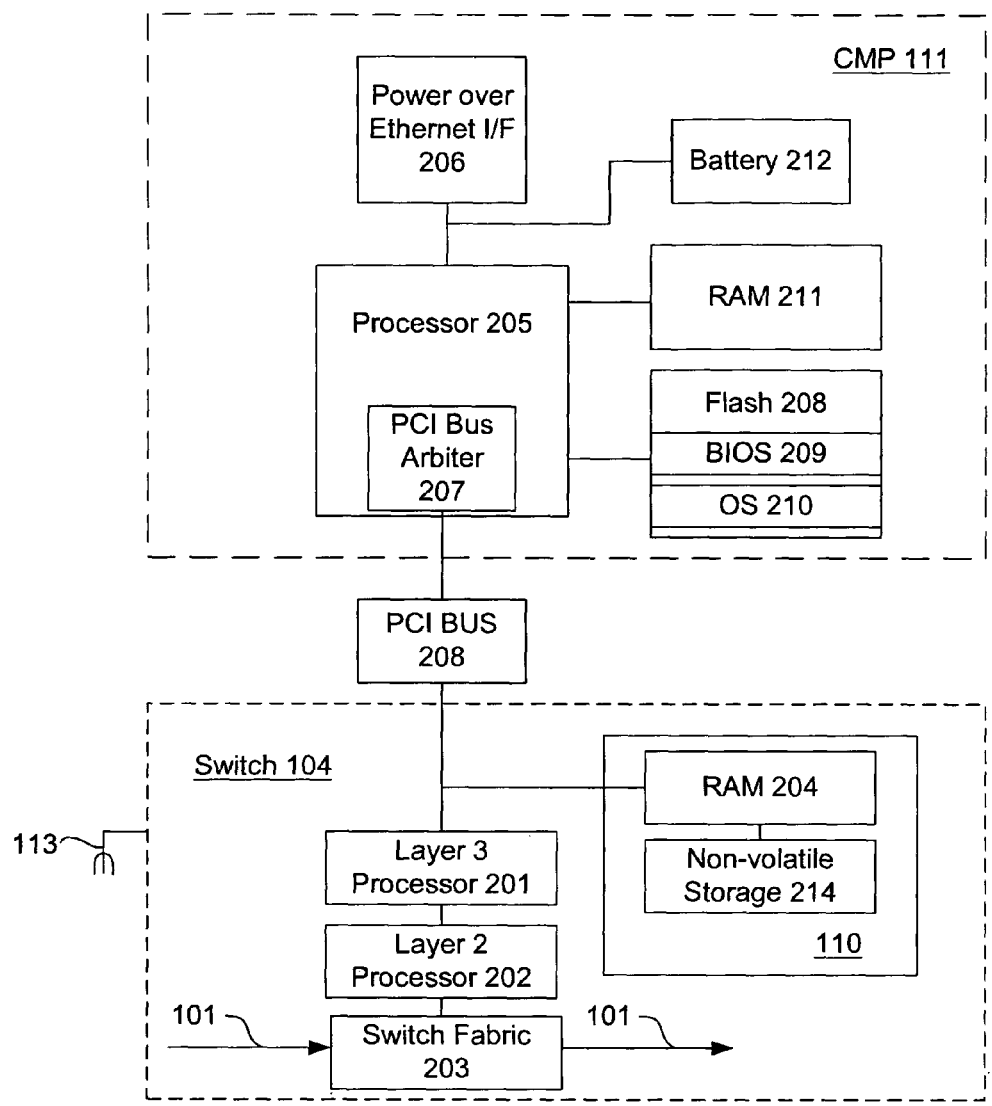
FIG. 2 illustrates an embodiment of a network device having a connectivity manager processor (CMP) to handle the out-of-band communication tasks for the network device in accordance with an embodiment of the present invention.

FIG. 2 illustrates an exemplary network device, such as switch 104, in more detail. Specifically, switch 104 includes two processors 201 and 202 that are responsible for controlling the operation of the switch and providing the necessary network services. In a switch, processor 201 is responsible for determining the destination of each inbound layer 3 packet and configuring a switch matrix 203 to ensure that the outbound packet is transmitted along the optimal route. Processor 202 is responsible for determining the destination of each layer 2 frames and calculating the most efficient route to the proper local destination within a domain.

Processors 201 and 202 will maintain a list of system variables that correspond to the operational status information of the switch. This status information is useful for many purposes including load balancing, fault detection and isolation and configuration management.

Status information is updated in real time and stored in data structure 109 in RAM 204 or non-volatile storage device such as a flash memory storage system 214. Rather than require processors 201 and 202 to respond to polling requests from tool 108 or other network device, CMP 111 monitors data structure 109 and provides the status information in response to polling requests. By off-loading the task of responding to each polling request, processors 201 and 202 can be dedicated to their respective in-band tasks, specifically, maintenance of switching operations and providing network services such as building and maintaining switching tables and optimal routes.

The main purpose of CMP 111 is to be function as a transparent bridge between an upstream Ethernet device and the networked device. When status information is updated, CMP 111 pulls up the data so that when the next polling request is received, the CMP acts as a proxy for the network device thereby improving operational efficiency of the network device. When the network device goes down, CMP 111 provides the system administrator the ability to monitor the boot process and to get the network device back on line.

With CMP 111, a network administrator may access remote network devices using Telnet or Secure Shell Host (SSH) software. Once the administrator logs into the network device, which can be at a great distance away, from the administrator's computer, it is possible to monitor the network device during both the boot process and normal operation because the CMP maintains the Ethernet connection and access to device memory during any reboot or power cycle.

CMP 111 comprises a microprocessor 205, which in one preferred embodiment, is a PowerPC available from IBM Corporation although other microprocessors, embedded processors or processor cores could be used. Microprocessor 205 operates at low power and at a relatively low clock rate. Microprocessor 205 supports Ethernet, RS-232 and U.S.B protocols and it includes at least one 10/100 full-duplex Ethernet port that is coupled to the Ethernet by a physical layer (PHY) device 206. Device 206 provides the advanced functionality to optimize gigabit physical layer implementations. Microprocessor 205 also includes a PCI bus arbiter 207 that interfaces microprocessor 205 to a 32-bit asynchronous PCI bus 208.

CMP 111 is configured to handle all Ethernet control and processing transactions for switch 104 as well as the additional function of responding to polling requests issued on the out-of-band channel 102. In response to a polling request, microprocessor 205 reads the status information in RAM 204 and provides the information to the requesting device. It will be appreciated that as networks become more complex, the need for each switch to determine the status of all of the other switches will increase. For example, in a typical prior art network, SNMP management tools polls network device to get operational statistics. However, SNMP can only poll on a per interface basis and current switch technology can support 1,100 interfaces. In the near future, switches will support over 4,000 interfaces and when DSL aggregation is considered, there could be over 100,000 interfaces and SNMP polling process can take over 90 minutes or more to complete. Further, multiple devices can send out polling requests—one for configuration management, one for performance statistics, one for cost statistics etc. Very soon, the execution resources of processors 201 and 202 can be substantially consumed by merely responding to SNMP polling requests. In accordance with one aspect of the present invention, CMP 111 acts as a proxy for processors 201 and 202 so that polling has no impact on operational performance of the switch and provide substantial performance improvement.

Microprocessor 205 includes Flash memory 208 to store boot or BIOS code 209 and an operating system code 210 sufficient to enable CMP 111 to function as the connectivity manager on the Ethernet bus. Microprocessor 205 also includes random access memory (RAM) 211 to store updated system parameters or to buffer communication packets transmitted on channel 102.

To further minimize power, microprocessor 205 preferably will enter a low-power operating mode when CMP 1111 is idle without affecting operational performance or software execution. Power management is important because CMP 111 draws its power from the Ethernet connection or from an optional on-board battery 212 if power supply 112 is not functional. Using the power over Ethernet function is an important aspect of CMP because it enables the administrator to maintain a connection with CMP 111 even if power plug 113 is disconnected from an electrical outlet and no other power is applied to switch 104. The administrator can then re-boot the device and monitor the start up process rather than having to wait for the switch to boot to an operational level. A further advantage provided by CMP 111 arises from the ability of the network administrator to gain control of the network device even if the boot block or other operating system code of the switch is damaged or otherwise corrupted.

Because power faults are common and difficult to preempt and because all routers, switches, and other network devices will over time develop hardware problems, it will eventually become necessary to reboot every network device. During the reboot process, management tools 108 would not be able to poll prior art network devices. However, because CMP 111 is powered by a separate power source, it will remain functioning even when the associated network device is rebooted. In one preferred embodiment, the CMP is packaged on a standardized interface card so that it is easily ported all of the network devices in an enterprise's DCN. Because it is a low power device dedicated to managing the Ethernet connection, console connectivity is standardized. In an Ethernet based DCN, CMP 111 preferably employs IP protocols to natively connect to and maintain the connection to the associated network device during a power cycle or system boot.

Advantageously, CMP 111 migrates the network management agents to a dedicated layer so that processors 201 and 202 are not encumbered by having to respond to polling requests. Rather CMP 111 responds to polling requests thereby minimizing the resource load on other processors in the network device improve network efficiency. More specifically, CMP is a network management abstraction layer that functions independently from the rest of the network device and that off-loads tasks associated with network management functions conducted on the out-of-band channel.

Figure 3:
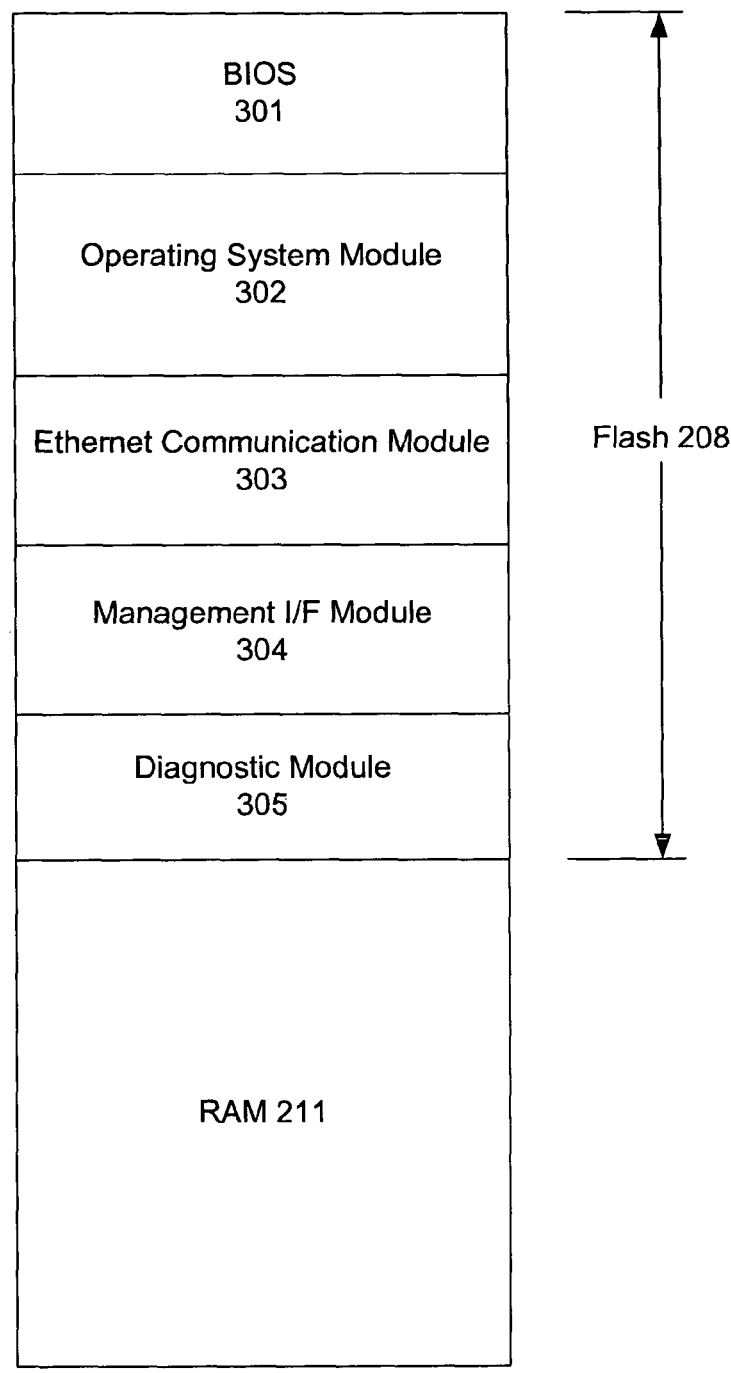
FIG. 3 illustrates a simplified memory map of the CMP memory in accordance with an embodiment of the present invention.

FIG. 3 illustrates a memory map 300 for CMP 111. Flash memory 208 sits in high memory and RAM 211 occupies low memory. BIOS 301 occupies the top of the Flash memory 208. BIOS 301 contains executable code for initializing microprocessor 205 and the bus interfaces 206 and 207. An operating system module 302 occupies the remaining portions of Flash memory 208. Operating system module 302 includes the operating system code that enables microprocessor 205 to manage the connectivity functions performed by CMP 111. Operating system module 302 issues calls to both Ethernet communication module 303 and management interface module 304 as necessary. Modules 303 and 304 contain executable code that enables microprocessor 205 to transfer Ethernet packets to the appropriate destination and that enables microprocessor 205 to access memory 110 over the PCI bus 208, respectively.

Operating system 302 may optionally include a set of diagnostic routines 305. The administrator may run diagnostics on the network device may activate diagnostic routines 305 that are executed by CMP 111. In this manner, execution resources of processor 201 and 202 are not used to run diagnostic routines.

Figure 4:
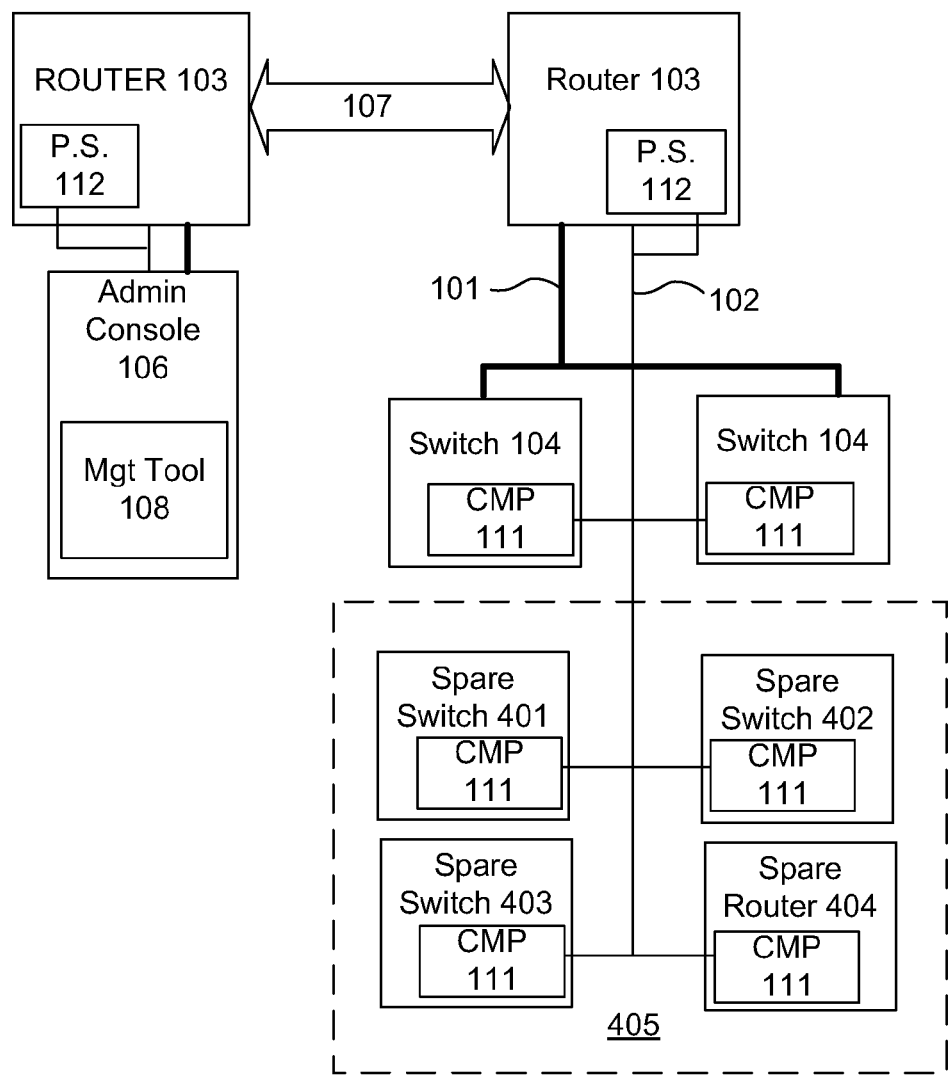
FIG. 4 illustrates the a network system having a plurality of spare network devices being monitored while stored in a spares closet in a power down state in accordance with an embodiment of the present invention.

Refer now to FIG. 4. CMP 111 is a "boot once" or "boot rarely" device once it is connected to channel 102 because power is supplied over channel 102 and because microprocessor 205 executes the operating system code directly from memory. Whenever CMP 111 is connected to channel 102, the system administrator can communicate or poll the CMP and it is immaterial whether remainder of the network device is powered up. This feature enables spare network devices to be coupled to the network and remain visible to the network administrator even if there is no local power in a spare device closet. Thus, the network administrator can use console 104 to conduct a periodic polling of spare devices and maintain an accurate count of spare network devices, such as spare network devices 401-404 stored in a spares closet. Advantageously, because CMP 111 only requires the Ethernet connection, there is no need to power up the spare devices when stored in a storage closet or cage 405. Since the spare devices are not connected to a power source, there is no need to configure the storage closet with a power source or with cooling equipment. Rather, an Ethernet connection provides power and the network connection to CMP 111.

In one embodiment, one or more serial numbers, device IDs, model numbers, device configuration information and other information is stored in non-volatile memory of the CMP so that it is possible to determine, not only the availability the spare network device but also the hardware and software configurations of the spares.

If a spare network device is decoupled from the out-of-band network, an alarm is generated so that expensive networking gear is not easily stolen or moved to an unauthorized location. Further, since the entire device need not be powered up for the administrator to maintain its device monitoring, there is tremendous saving in power and the life expectancy of the network device is not affected.

Although the invention has been described with respect to specific embodiments thereof, these embodiments are merely illustrative, and not restrictive of the invention. For example, the network device may be any Ethernet capable device such as a hub, bridge, computer system, workstation, server or a network storage device. Although the out-of-band channel may be any bus or communication media, one preferred embodiment is based on the Gigabit Ethernet other serial communication medium. Further, CMP 111 comprises software algorithms that implement connectivity functions between the network device and other devices on the back channel. While not all devices are shown with a CMP, it is to be understood that devices, such as routers 103 may also include a CMP that is powered from either the on-board power supply 112, an on-board battery 212 or from some other external power supply.

The executable code described herein may be implemented in any suitable programming language to implement the routines of the present invention including C, C++, Java, assembly language, etc. Different programming techniques can be employed such as procedural or object oriented. The routines can operate in an operating system environment or as standalone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein "memory" for purposes of embodiments of the present invention may be any medium that can contain, store, communicate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, computer memory.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
providing an out-of-band network connection to at least one device coupled to an in-band network, the at least one device including a non-volatile memory;
performing network management functions which include enabling an administrator to maintain maintaining the out-of-band network connection to the at least one device, wherein the out-of-band network connection is configured to supply at least 12 watts of power to the at least one device so as to enable the out-of-band network connection to be active during all power on and power off states of the at least one device so as to facilitate monitoring a status of the at least one device, the status determined from information stored in the non-volatile memory; and
monitoring the at least one device during at least during a boot process over the out-of-band network connection, wherein the monitoring is performed by utilizing a processor at the at least one device, wherein the processor is dedicated to performing network management functions over the out-of-band network and is configured to execute an operating system stored in the non-volatile memory, and wherein the operating system is configured only to provide the network management functions over the out-of-band network.

2. The method of claim 1 wherein the out-of-band network connection is maintained at all times by a power supply that is coupled to a connectivity processor at the at least one device, and wherein the power supply is external to the at least one device.

3. The method of claim 1 further comprising providing a network management abstraction layer that is functionally separate from said at least one device.

4. The method of claim 3 further comprising providing power to said abstraction layer over the out-of-band network.

5. The method of claim 4, further comprising utilizing an Ethernet network in the network.

6. The method of claim 3 further comprising providing power to said abstraction layer over an Ethernet network.

7. The method of claim 1 wherein the processor is configured to provide status information, and wherein the status information is provided even for a condition where power to the at least one device is removed.

8. The method of claim 1 wherein the processor is configured to respond to polling requests in order to reduce a level of resource loading on other processors in the at least one device.

9. A system configured to implement the method of claim 8.

10. A non-transitory computer-readable medium having instructions for executing in the processor in the method of claim 8.

11. The method of claim 1 wherein said monitoring further comprises:
accessing the memory of the at least one device to acquire updated system performance parameters of the at least one device; and
providing the updated system performance parameters obtained from the non-volatile memory in response to a polling request received over the out-of-band network.

12. The method claim 1 further comprising utilizing the processor having a wireless area network (WAN) interface card form factor.

13. The method of claim 1, further comprising configuring the out-of-band network connection to be only accessible by a network administrator.

14. The method of claim 1, further comprising configuring the in-band network connection to be only accessible by all network users.

15. A system comprising:
a processor dedicated to performing network management functions over an out-of-band network;
an interface to the out-of-band network;
non-volatile memory for storing an operating system and network management software to be executed by said processor, wherein the operating system is configured only to provide network management functions over the out-of-band network;
network management tools configured to perform network management functions which include enabling an administrator to maintain the out-of-band network connection so as to monitor information stored in the non-volatile memory during at least a boot activity of a network device during a boot process of the network device, the network device characterized as being associated with said processor, the network management tools coupled to the network device by a system bus, wherein an electrical connection between the network device and an out-of-band management network is configured to be active during all power on and power off states of the network device so as to facilitate monitoring a status of the network device, the out-of-band network configured to supply at least 12 watts of power to the network device so as to facilitate the electrical connection; and
a power source that is configured to provide power to the system over the out-of-band network.

16. The system of claim 15 wherein the out-of-band network comprises a data communication network.

17. The system of claim 16 wherein the network device is powered separately from the out-of-band network.

18. The system of claim 17 further comprising means for responding to SNMP polling requests directed to the network device.

19. The system of claim 15 further comprising a power supply that is coupled to a connective processor at the network device, wherein the power supply is configured to maintain the electrical connection at all times, and wherein the power supply is external to the at least one device.

20. The system of claim 15 wherein the system is configured to respond to polling requests to provide status information for the network device.

21. The system of claim 20 wherein the system has a form factor.

22. The system of claim 15 wherein the system is configured to determine a serial number of the network device when the network device is in a powered down state.

23. A method comprising:
providing a plurality of devices coupled to an Ethernet based out-of-band network, each of the plurality of devices in the plurality including a non-volatile memory;
providing at least 12 watts of power to at least one of the plurality of devices over the Ethernet based out-of-band network;
providing a network management tool to perform network management functions which include enabling an administrator to maintain the Ethernet based out-of-band network connection so as to monitor information stored in the non-volatile memory of the at least one of the plurality of devices during at least a boot process of the at least one of the plurality of devices, wherein the network management tool is configured to utilize a processor at the at least one of the plurality of devices, the processor dedicated to performing network management functions over the Ethernet based out-of-band network; and
executing, with the processor, an operating system stored in the non-volatile memory, wherein the operating system is configured only to provide network management functions over the Ethernet based out-of-band network, wherein an electrical connection between the network management tool and the at least one of the plurality of devices is active during all power on and power off states of the network device so as to facilitate monitoring a status of the at least one of the plurality of devices, the electrical connection enabled by the at least 12 watts of power provided through the Ethernet based out-of-band network.

24. The method of claim 23 further comprising:
providing a separate source of power to a portion of the at least one of the plurality of devices; and monitoring, with the network management tool, the at least one of the plurality of devices when the separate source of power is removed.

25. The method of claim 24 further comprising providing a network management abstraction layer that is functionally separate from the at least one of the plurality of devices.

26. The method of claim 25 further comprising providing the power to the abstraction layer over the Ethernet based out-of-band network.

27. The method of claim 26 further comprising utilizing a processor to implement the abstraction layer.

28. The method of claim 25 wherein said monitoring further comprises:
   accessing memory of the at least one of the plurality of devices to acquire updated status information; and
   providing said system status information in response to a polling request.

29. The method of claim 23, further comprising maintaining the connection at all times by a power supply that is coupled to a connective processor at the at least one of the plurality of devices, and wherein the power supply is external to the at least one of the plurality of devices.

30. The method of claim 23 further comprising using said processor to execute diagnostic routines on the at least one of the plurality of devices.

31. A network system comprising:
   an out-of-band management network coupling a power supply to at least one connectivity management processor (CMP), the CMP further coupled to a network device, the network device including a non-volatile memory, the CMP dedicated to performing network management functions over the out-of-band management network and configured to connect to and maintain an electrical network connection over the out-of-band management network when the network device is in a state consisting of an unpowered state, a power on state, and a system boot state, wherein the out-of-band network is configured to supply at least 12 watts of power to the network device so as to facilitate the electrical network connection to be active during all of the states, the CMP configured to determine an operational status of the network device and to serve as a proxy for the network device when the network device is polled by an out-of-band management tool; and
   network management tools that perform network management functions which include enabling an administrator to maintain the out-of-band management network connection so as to monitor information stored in the non-volatile memory of the network device during at least the boot state over the electrical network connection over the out-of-band management network, wherein the network management tool is configured to perform the monitoring by utilizing a processor at the network device, wherein the processor is configured to execute an operating system stored in the non-volatile memory, and wherein the operating system is configured only to provide network management functions over the out-of-band management network.

32. The system of claim 31 wherein the out-of-band management network comprises a data communication network.

33. The system of claim 31 wherein the out-of-band management network comprises an Ethernet network.

34. The system of claim 31 wherein the network device is separately powered from the out-of-band management network.

35. The system of claim 31 wherein said CMP is packaged on a standardized interface card so that the CMP is configured to be ported to all of the network devices coupled to the out-of-band management network.

* * * * *